United States Patent
Uchida et al.

(10) Patent No.: US 8,934,118 B2
(45) Date of Patent: Jan. 13, 2015

(54) IMAGE PROCESSING DEVICE WHICH PERFORMS SETTING OF DEVICE BASED ON INFORMATION ACQUIRED

(75) Inventors: Hisashi Uchida, Kuze-gun (JP); Masaya Hashimoto, Itami (JP); Yoshiyuki Tamai, Itami (JP); Kazusei Takahashi, Nishinomiya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1326 days.

(21) Appl. No.: 12/482,682

(22) Filed: Jun. 11, 2009

(65) Prior Publication Data
US 2009/0310180 A1    Dec. 17, 2009

(30) Foreign Application Priority Data
Jun. 13, 2008    (JP) .................................. 2008-154977

(51) Int. Cl.
*G06F 15/00* (2006.01)
*H04N 1/00* (2006.01)

(52) U.S. Cl.
CPC ......... *H04N 1/0035* (2013.01); *H04N 1/00514* (2013.01); *H04N 1/00973* (2013.01)
USPC ........ 358/1.15; 358/1.13; 358/1.14; 715/783; 715/708; 714/26

(58) Field of Classification Search
None
See application file for complete search history.

(56) References Cited

U.S. PATENT DOCUMENTS

| | | | | |
|---|---|---|---|---|
| 5,434,963 A * | 7/1995 | Kuwamoto et al. | ........... | 715/708 |
| 5,636,376 A * | 6/1997 | Chang | ........... | 717/127 |
| 5,835,770 A * | 11/1998 | Shum et al. | ........... | 717/127 |
| 6,674,537 B2 * | 1/2004 | Kadowaki | ........... | 358/1.15 |
| 6,944,653 B2 * | 9/2005 | Fong et al. | ........... | 709/220 |
| 7,068,165 B2 * | 6/2006 | Takahashi et al. | ........ | 340/539.26 |
| 7,343,114 B2 * | 3/2008 | Uruta | ........... | 399/80 |
| 7,451,085 B2 * | 11/2008 | Rose et al. | ........... | 704/244 |
| 7,554,522 B2 | 6/2009 | Sinclair, II et al. | | |
| 7,614,010 B2 * | 11/2009 | Hosoki et al. | ........... | 715/783 |

(Continued)

FOREIGN PATENT DOCUMENTS

| | | |
|---|---|---|
| JP | 2001-024824 | 1/2001 |
| JP | 2002-041250 | 2/2002 |

(Continued)

OTHER PUBLICATIONS

Notice of Grounds of Rejection issued in the corresponding Japanese Patent Application No. 2008-154977 dated May 25, 2010, and an English Translation thereof.

(Continued)

*Primary Examiner* — Ashish K Thomas
(74) *Attorney, Agent, or Firm* — Buchanan Ingersoll & Rooney PC

(57) ABSTRACT

When a user uses an image processing device, the image processing device accesses a private PC of the user connected to a network to request acquisition of environmental information. A printer driver in the private PC collects various settings (including desktop theme, application settings, and device driver settings) from within the private PC. The settings are transmitted to the image processing device. The image processing device, based on the acquired setting information, changes the panel display, application settings, and others. This simplifies setting of the image processing device.

13 Claims, 9 Drawing Sheets

(56) References Cited

U.S. PATENT DOCUMENTS

| | | | |
|---|---|---|---|
| 7,800,768 B2 * | 9/2010 | Yamada | 358/1.13 |
| 7,822,687 B2 * | 10/2010 | Brillon et al. | 705/59 |
| 7,920,760 B2 * | 4/2011 | Yoda | 382/305 |
| 7,929,168 B2 * | 4/2011 | Tanimoto | 358/1.15 |
| 7,930,208 B2 * | 4/2011 | Sharman et al. | 705/14.53 |
| 8,031,348 B2 * | 10/2011 | Wang et al. | 358/1.14 |
| 8,032,556 B1 * | 10/2011 | Cook et al. | 707/783 |
| 8,065,317 B2 * | 11/2011 | Wang et al. | 707/769 |
| 8,072,636 B2 * | 12/2011 | Mizuno | 358/1.15 |
| 8,248,646 B2 * | 8/2012 | Ando | 358/1.15 |
| 8,474,051 B2 * | 6/2013 | Araki | 726/26 |
| 8,532,895 B2 * | 9/2013 | Desfriches et al. | 701/68 |
| 2004/0252341 A1 | 12/2004 | Adachi et al. | |
| 2005/0108530 A1 * | 5/2005 | Tonegawa | 713/170 |
| 2006/0123081 A1 * | 6/2006 | Baudino et al. | 709/204 |
| 2006/0195495 A1 | 8/2006 | Asano | |
| 2007/0067269 A1 * | 3/2007 | Rudge et al. | 707/3 |
| 2008/0167801 A1 * | 7/2008 | Geelen et al. | 701/201 |
| 2008/0275974 A1 * | 11/2008 | Rackiewicz | 709/223 |
| 2009/0237201 A1 * | 9/2009 | Sato | 340/5.2 |

FOREIGN PATENT DOCUMENTS

| | | |
|---|---|---|
| JP | 2002-344681 A | 11/2002 |
| JP | 2004-200955 | 7/2004 |
| JP | 2004-220417 | 8/2004 |
| JP | 2004-236212 | 8/2004 |
| JP | 2005-004664 | 1/2005 |
| JP | 2006-178966 | 7/2006 |
| JP | 2006-231760 A | 9/2006 |
| JP | 2006-238199 | 9/2006 |
| JP | 2007-053555 | 3/2007 |
| JP | 2007-055099 | 3/2007 |
| JP | 2007-079830 | 3/2007 |
| JP | 2007-249089 | 9/2007 |

OTHER PUBLICATIONS

Office Action issued by the Japanese Patent Office on Jun. 5, 2012 in corresponding Japanese Patent Application No. 2011-008589, and English translation thereof.

* cited by examiner

FIG.12

```
Subject:   Send File from KONICA MINOLTA  C550
   Date:   Wed, 29 Jun 2007 11:22:33
   From:   KONICA MINOLTA  C550
     To:   aaa@xxx.jp
--------------------------------------------------------------

(See attached file: 20070629112233.pdf)
```

FIG.13

```
Subject: Send File from KONICA MINOLTA  C550
   Date: Wed, 29 Jun 2007 11:22:33
   From: KONICA MINOLTA  C550
     To: aaa@xxx.jp THIS MESSAGE IS BEING SENT ENCRYPTED.
THIS MESSAGE IS BEING SENT WITH A DIGITAL SIGNATURE.
--------------------------------------------------------------

(See attached file: 20070629112233.pdf)
```

IMAGE PROCESSING DEVICE WHICH PERFORMS SETTING OF DEVICE BASED ON INFORMATION ACQUIRED

This application is based on Japanese Patent Application No. 2008-154977 filed with the Japan Patent Office on Jun. 13, 2008, the entire content of which is hereby incorporated by reference.

BACKGROUND OF THE INVENTION

1. Field of the Invention

The present invention relates to an image processing device, an image processing system, and a control program for the image processing device. More particularly, the present invention relates to an image processing device, an image processing system, and a control program for the image processing device which facilitate setting of the image processing device.

2. Description of the Related Art

Image processing devices (such as a multi function peripheral (MFP), which is a composite machine provided with scanning, facsimile transmitting/receiving, copying, printing, data communicating, and server functions, a facsimile machine, a copier, a printer, a scanner, and the like) may be provided with a user authentication function. The user authentication function is a function used by the image processing device to determine user's legality (use authority) according to whether the person who attempts to use the image processing device is registered in advance. The user authentication may be performed using one of the following methods: (1) perform a typical login process by prompting the user to input an ID and a password; (2) read a magnetic card or the like provided to the user; and (3) perform biological authentication using a fingerprint and the like. The user authentication is initially carried out every time a user attempts to use the image processing device.

The user authentication enables identification of individuals who use the image processing device. The image processing device may be provided with a function of customizing an operation screen (operation panel) for a respective one of the specified users to display a customized screen dedicated to the user. In the customized screen, color settings and display items may be registered according to the user's preferences. In addition, for improved accessibility, color settings which can readily be identified by a person with an impaired color vision, and a character size which can readily be read by a person with weak eyesight may be registered as well.

To set up the device for improving accessibility, however, the user needs to do so via an initial-state operation screen, which may be difficult for the handicapped user to operate. That is, the person with an impaired color vision or weak eyesight will have to perform setting of the device via the operation screen in the initial state in which the person will have difficulty in reading the contents.

To solve the above-described problem, it may be conceivable, as described in Japanese Patent Application Laid-Open No. 2002-344681, to register personal information including the user's sense of vision as well as sense of hearing on an image processing device in advance and change the display contents based on the personal information.

It may also be conceivable to store personal settings for a respective user, in addition to a customized screen therefor, in the image processing device. For example, security-related settings, including the use of encryption and/or electronic signature when transmitting e-mail, and default settings for a job operation, may be stored.

Further, Japanese Patent Application Laid-Open No. 2006-231760 discloses a technique to save the troubles of setting, while keeping security, by retaining various kinds of setting values for a printing device for each user. When a registered, authenticated user logs in to a printing device, the printing device stores, in a storage unit, settings which determine the working condition of the device. At the time of next login, the printing device reads the settings from the storage unit to operate based on the read settings.

The settings include a color designation for the operation screen included in the printing device. With the settings, colors for the background of the operation screen, characters, and keys may be set individually.

In the case of registering a customized screen as described above, there are many items that can be set, and thus, it would rather be troublesome for the user to set the colors and display contents to suit the user's preferences. That is, it takes a lot of troubles to store the settings for the operation panel and for printing for a respective user, as in the technique disclosed in Japanese Patent Application Laid-Open No. 2006-231760 described above.

Furthermore, in the case of registering personal information including the information related to accessibility for a handicapped person, as disclosed in Japanese Patent Application Laid-Open No. 2002-344681 described above, the contents concerning privacy issues including the user's sense of vision and sense of hearing would have to be registered, which is undesirable in consideration of the risk of leakage of the personal information.

Furthermore, in the case where the security level set in the image processing device is poorer than the security level set in a private personal computer (PC) the user usually uses, the user may not be aware of it. This is undesirable because security vulnerability, unintended by the user, would exist in the system.

SUMMARY OF THE INVENTION

The present invention has been accomplished to solve the above-described problems, and an object of the present invention is to provide an image processing device, an image processing system, and a control program for the image processing device which facilitate setting of the image processing device.

To achieve the above object, according to an aspect of the present invention, an image processing device includes: an identifying unit to identify a user of the image processing device; a reading unit to read information for communicating with an external device which is registered in association with the user identified by the identifying unit; an acquiring unit to acquire information which is set in the external device associated with the user identified by the identifying unit, by communicating with the external device using the information read by the reading unit; and a setting unit to perform setting of the image processing device based on the acquired information.

According to another aspect of the present invention, an image processing system includes an image processing device and an external device connected via a network, wherein the image processing device includes: an identifying unit to identify a user of the image processing device; a reading unit to read information for communicating with an external device which is registered in association with the user identified by the identifying unit; an acquiring unit to acquire information which is set in the external device associated with the user identified by the identifying unit, by communicating with the external device using the information read by the reading unit; and a setting unit to perform setting of the image processing device based on the acquired information; wherein the external device includes: a collecting unit to collect at least one of information regarding environmental settings in the external device, information regarding settings for a device driver installed in the external device, and information regarding settings for an application installed in the external device; and a transmitting unit to transmit the collected information to the image processing device; and wherein the acquiring unit in the image processing device acquires the information transmitted from the transmitting unit in the external device.

According to a further aspect of the present invention, a control program for an image processing device stored in a computer readable medium causes a computer to execute processing including: an identifying step of identifying a user of the image processing device; a reading step of reading information for communicating with an external device which is registered in association with the user identified in the identifying step; an acquiring step of acquiring information which is set in the external device associated with the user identified in the identifying step, by communicating with the external device using the information read in the reading step; and a setting step of performing setting of the image processing device based on the acquired information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 shows a display example of e-mail text in the MFP with default settings.

FIG. 13 shows a modification example of the e-mail settings.

DESCRIPTION OF THE PREFERRED EMBODIMENTS

Figure 1:
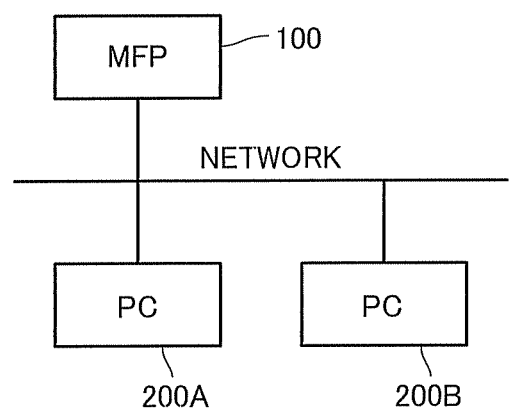
FIG. 1 shows the configuration of an image processing system according to an embodiment of the present invention.

Referring to FIG. 1, an image processing system includes an MFP 100 as an example of the image processing device and a plurality of personal computers (PCs) 200A and 200B as examples of a plurality of external devices, which are connected to a network. It is noted that the system may include, in place of the PCs, mobile phones, personal digital assistants and other devices which are used by the individuals.

MFP 100 has a user authentication function. The user authentication function, as described above, is the function that is used by the image processing device to determine legality (use authority) of a user. For the user authentication, any of the following methods may be used in the present embodiment: (1) perform a typical login process by prompting the user to input an ID and a password; (2) read a magnetic card or the like provided to the user; and (3) perform biological authentication using a fingerprint and the like. In the following description, it is assumed that the user authentication is performed by using a typical login process by prompting the user to input an ID and a password. The user authentication is carried out every time a user uses an image processing device. The user authentication allows identification of individual users who use the image processing device.

MFP 100 includes an operation/display unit (operation panel) which is composed of a liquid crystal display and a transparent touch panel stacked thereon. The user registered in MFP 100 is associated with a PC that the user uses. That is, the ID of a respective user of the MFP and an IP address assigned to the PC that the user usually uses (which is a PC exclusively used by that user, also referred to as a "private PC") are associated with each other and stored in the MFP.

A control program (such as a printer driver) installed in the PC has a function of referring to and collecting environmental setting information for the PC, setting information for a device driver installed in the PC, and setting information for an application installed in the PC. The device driver refers to software which controls hardware such as a graphic display and a mouse (irrespective of whether they are peripheral devices of the PC or elements built in the PC) to provide an interface for the application software.

When an authenticated user logs in to the MFP, or in accordance with an instruction from the authenticated user, the MFP accesses a control program for the PC associated with that user. In this manner, the MFP collects the above-described setting information, and based on the information, performs environmental settings for the operation screen in the MFP, or settings for the applications in the MFP.

More specifically, MFP 100 accesses an external device (private PC) over the network to acquire the information set in the external device. MFP 100 generates a display content in the operation/display unit and the like based on the acquired setting information.

The setting information to be acquired may include: environmental settings for the desktop in the PC; settings related to accessibility in the PC, environmental settings for electronic mail software (including a character size of the text) in the PC, security settings for the electronic mail software (including whether encryption and/or electronic signature is enabled) in the PC, environmental settings for a Web browser (including a character size) in the PC, and security settings for the Web browser (including a permission level of Cookies and execution permission of active script) in the PC.

The environmental settings for the desktop in the PC may include: a character size for icons (and monitor size and resolution), and color settings for the desktop (including text color and background color). The character size for the icons that is set in the private PC is acquired and reflected to the character size (and monitor size and resolution) for the operation panel in the MFP. Further, the color settings for the desktop are acquired and reflected to the color settings (including text color and background color) for the operation panel in the MFP.

Specifically, assume that a user who usually uses a private PC is authenticated by and permitted to use the MFP. In the case where the character size for the icons that is set in the private PC of that user is larger than the standard size, the character size for the operation panel in the MFP is increased from the standard size in conformity with the settings in the private PC. Further, in accordance with the color settings (background colors, text colors, etc.) for the desktop in the private PC of that user, similar colors are used for the display of the operation panel in the MFP.

The settings related to accessibility in the PC may include: whether the mouse has been set for a left-handed user (by switching the functions of the right and left buttons of the mouse); whether speech recognition software has been installed; and whether a read-aloud function has been used before. These settings related to the accessibility in the PC are acquired from the setting information for the device drivers installed in the private PC. If the mouse of the private PC has been set for a left-handed user, the operation panel in the MFP is set for a left-handed user as well (i.e., the button arrangement on the operation screen is reversed between right and left). Further, if the speech recognition software has been installed in the PC, the speech recognition mode is enabled in the MFP. Furthermore, if the read-aloud function has been used before in the PC, the character read-aloud mode in the MFP is enabled.

When the environmental settings for the electronic mail software (including the character size for the text) in the PC are acquired, they are adapted to the environmental settings for the e-mail transmitting/receiving function in the MFP.

When the security settings for the electronic mail software (including whether encryption and/or electronic signature is used) in the PC are acquired, they are adapted to the security settings for the e-mail transmitting/receiving function in the MFP.

When the environmental settings for the Web browser (including the character size) in the PC are acquired, they are adapted to the environmental settings for the Web browser in the MFP.

When the security settings for the Web browser (including the permission level of Cookies and execution permission of active script) in the PC are acquired, they are adapted to the security settings for the Web browser in the MFP.

Figure 2:
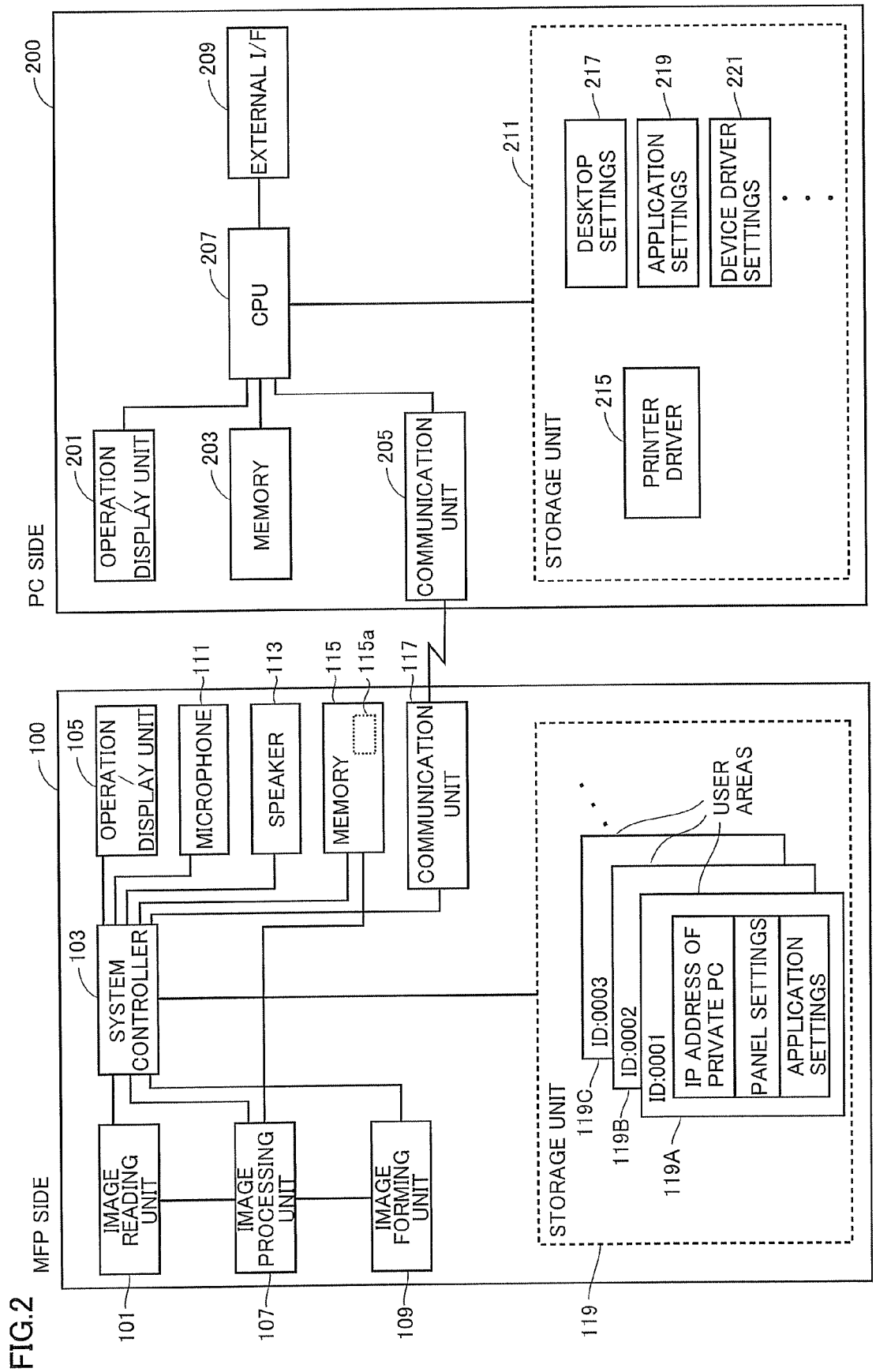
FIG. 2 is a block diagram showing the configurations of an MFP 100 and a PC 200 which communicates with MFP 100.

FIG. 2 is a block diagram showing the configurations of MFP 100 and a PC 200 which communicates with MFP 100.

Referring to FIG. 2, MFP 100 includes: a system controller 103 which is responsible for overall control of the device; an image pickup unit 101 which is provided with an optical system such as a CCD and reads an image from an original; an image processing unit 107 which performs various processing on an image; an image forming unit 109 which includes a print engine for forming an image on a sheet of paper by well-known electrophotography or an inkjet technique; an operation/display unit (operation panel) 105 which includes a touch panel provided with a liquid crystal display, and displays information to a user and accepts an operation input from the user; a microphone 111 which inputs a sound; a speaker 113 which outputs a sound; a memory 115 for storing image data and various programs; a communication unit 117 which performs communication via a network; and a storage unit 119 (such as a hard disk) which stores image data, user information, and various programs.

A program 115a stored in memory 115 functions as a control program for the MFP, to cause the MFP to carry out the processing which will be described later.

Storage unit 119 has a plurality of user areas 119A, 119B, 119C, . . . . Each of the user areas stores: an IP address assigned to a private PC; settings for the operation panel in the MFP for that person; and settings for the applications in the MFP for that person.

User areas 119A, 119B, 119C, . . . are each associated with the corresponding user ID, so that it is possible for the MFP to read the IP address assigned to the private PC for the logged-in user, the settings for the operation panel in the MFP for that user, and the settings for the applications in the MFP for that user.

It is noted that the settings for the operation panel in the MFP and the settings for the applications in the MFP do not necessarily have to be stored in storage unit 119. Alternatively, at the time of login of a user, the MFP may obtain an IP address assigned to the private PC corresponding to the user ID of the logged-in user to access the private PC. By accessing the PC, the MFP acquires the settings in the private PC, to reflect the settings in the private PC to the settings for the operation panel in the MFP as well as to the settings for the applications in the MFP.

PC 200 includes: a CPU 207 which is responsible for overall control of the device; an operation/display unit 201 which is made up of a monitor, a keyboard, a mouse and the like; a memory 203 for storing image data and various programs; a communication unit 205 for communication via a network; an external I/F 209 for communication with external image storing devices such as a USB memory card, a digital camera, an external HDD and the like; and a storage unit 211 (such as a hard disk).

Storage unit 211 stores: a printer driver 215; settings 217 for the desktop in PC 200; settings 219 for the applications installed in PC 200; and settings 221 for the device drivers installed in PC 200.

Printer driver 215 is software for use in controlling MFP 100. Specifically, printer driver 215 controls MFP 100 based on a printing instruction from application software installed in the PC, to perform printing. The printer driver may be one for operating another printer rather than MFP 100. Printer driver 215 has, in addition to the function of controlling MFP 100, a function of collecting various settings for the PC from within the PC and transmitting the collected settings to MFP 100, which will be described later in detail.

In the present embodiment, the printer driver is configured to have the function of collecting various settings in the PC and transmitting them to MFP 100. Alternatively, dedicated software (a control program) having such a function may be stored in storage unit 211 for operation, or other software may be used to implement the function.

More specifically, printer driver 215 of the present embodiment, installed in PC 200, has the following functions: (1) the function as a typical printer driver; (2) the function of causing the PC to operate as a server; and (3) the function of searching for and collecting the desktop theme (including color settings for the monitor and a character size) in PC 200, settings for the applications including electronic mail software and a Web browser, and settings for the device drivers for a mouse and other devices.

Figure 3:
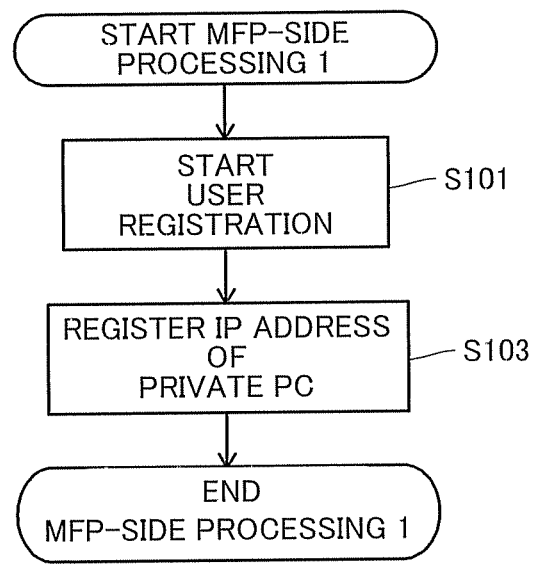
FIG. 3 is a flowchart illustrating user registration processing which is carried out by the MFP.

FIG. 3 is a flowchart illustrating user registration processing which is carried out by the MFP.

Referring to FIG. 3, in step S101, user registration is started. In the user registration, an input of user name and password from the user who uses the image processing system is accepted. Along with the user registration, in step S103, an input of the IP address of the user's private PC is accepted, which is registered in storage unit 119.

Figure 4:
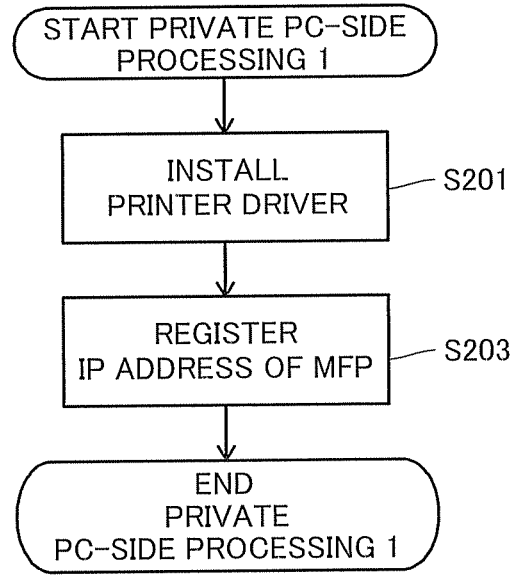
FIG. 4 is a flowchart illustrating processing of registering a private PC in a network.

FIG. 4 is a flowchart illustrating processing of registering a private PC in a network.

Referring to FIG. 4, in step S201, a printer driver is installed in the PC. In step S203, the IP address assigned to MFP 100 on the network is registered in the PC.

Figure 5:
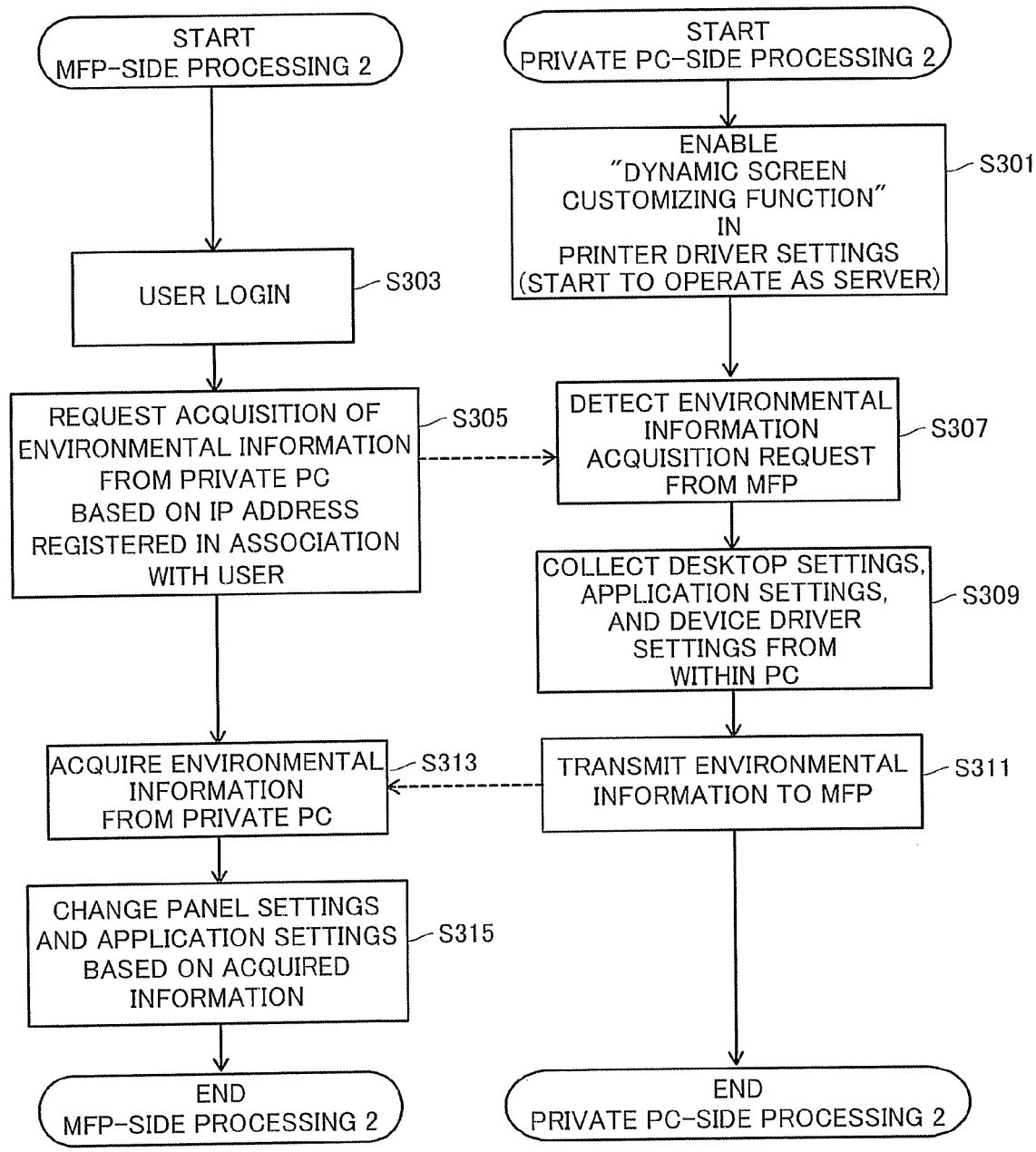
FIG. 5 is a flowchart illustrating processing carried out by the private PC and the MFP.

FIG. 5 is a flowchart illustrating processing carried out by the private PC and the MFP.

In step S301, in a setting screen for the printer driver in the private PC, an input for enabling a "dynamic screen customizing function" in the MFP is accepted from the user. The "dynamic screen customizing function" is a function of reflecting the settings in the private PC to the settings in the MFP. In response, the printer driver causes the private PC to function as a server, and the private PC starts to operate as the server. That is, with the MFP functioning as a client, the private PC comes to function as a server which transmits predetermined information to the MFP in response to an access from the MFP.

In step S303, the user of the private PC approaches the MFP and inputs the ID and the password for login to the MFP (although any other authentication method as described above may be used instead). The MFP identifies the user by accepting the login input. In step S305, the MFP reads the IP address of the private PC that is registered in association with the logged-in user. The MFP then accesses the private PC using the IP address. The MFP requests the private PC to acquire environmental information. In step S307, the private PC detects the request.

In step S309, the printer driver in the private PC collects various settings (including the desktop theme, application settings, and device driver settings) from within the private PC. The settings are transmitted to the MFP in step S311.

In step S313, the MFP acquires the settings transmitted. In step S315, the MFP changes the settings for the operation panel in the MFP, the settings for the applications in the MFP and the like, based on the setting information acquired.

Through the processing described above, the MFP reads the setting information from within the private PC, every time the user logs in (i.e., every time the MFP is used), to dynamically change the settings for the operation panel. Reading the setting information at each time of user login is advantageous in that the MFP can quickly address any change made to the setting information.

The setting information received from the private PC at the time of previous login may be held in the MFP (or in storage on the network) in preparation for the event that the private PC is not connected to the network. This enables the stored settings to be adapted when the private PC cannot be found. It is noted that the panel setting information and the application setting information for the MFP corresponding to the user of the private PC may of course be stored in association with the private PC, as in storage unit 119 shown in FIG. 2. The setting information stored may be used for setting the MFP when the private PC is not connected to the network.

Figure 6:
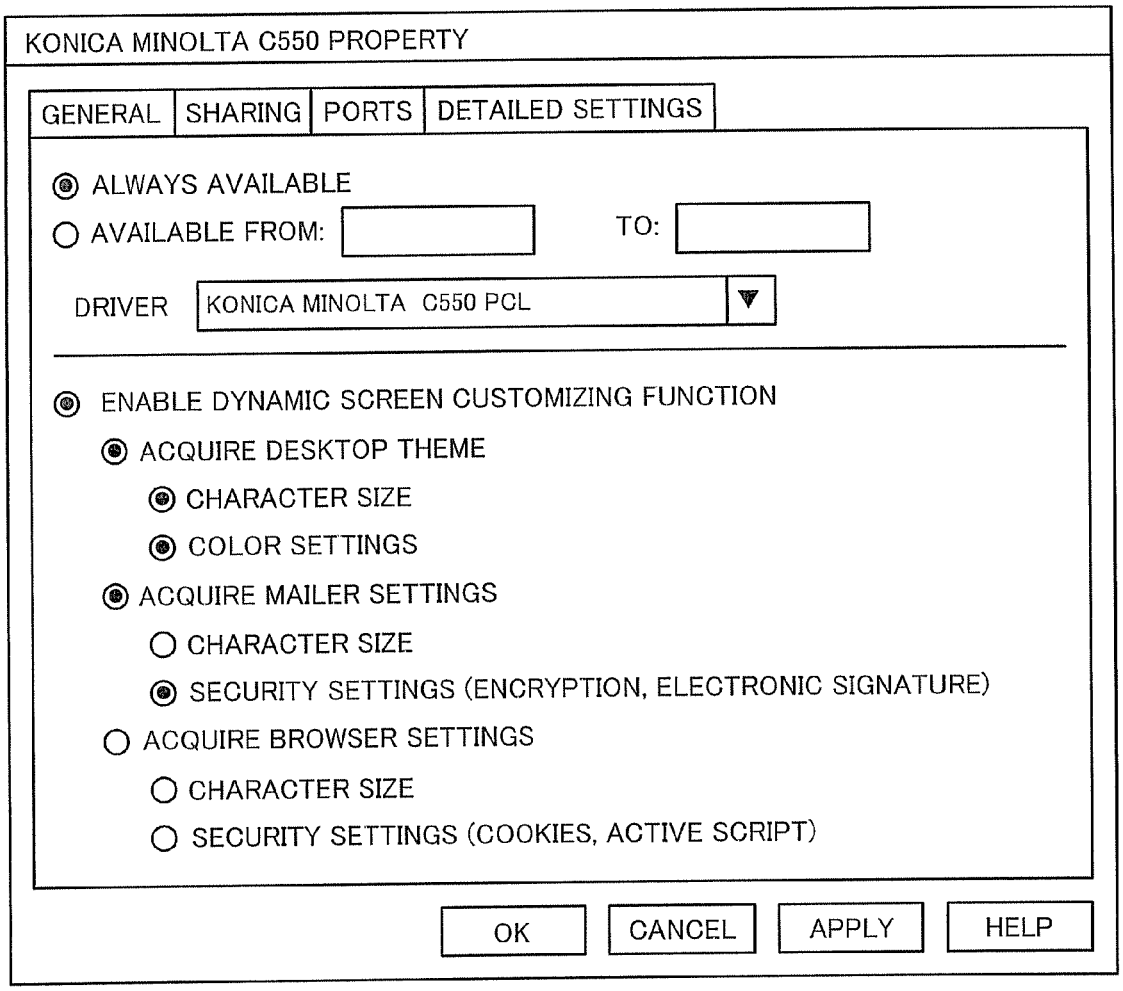
FIG. 6 shows a setting screen for a printer driver.

FIG. 6 shows a setting screen for the printer driver.

As shown in FIG. 6, the "dynamic screen customizing function" is enabled when the option of "enable the dynamic screen customizing function" is checked.

When enabling the "dynamic screen customizing function", it is also possible to set whether to acquire the following information: a character size in the PC desktop theme (which is a set of customized information for the PC), color settings in the PC desktop theme, a character size in the electronic mail software, security settings (including encryption and electronic signature) in the electronic mail software, a character size in the Web browser, and security settings (including Cookies and active script) in the Web browser, which may be selected independently of each other.

Figure 7:
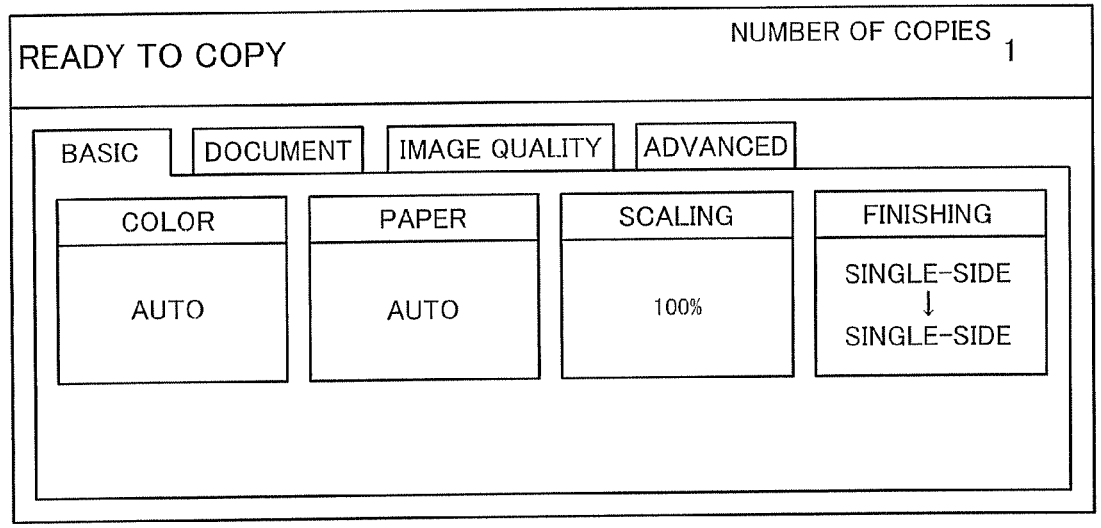
FIG. 7 shows a display example of the operation panel in the MFP with default settings.

FIG. 7 shows a display example of the operation panel in the MFP with default settings.

The operation panel allows the user to select the function to be used, from the tabs labeled: "basic", "document", "image quality", and "advanced".

Selecting the "basic" tab enables setting of color, paper, scaling, and finishing.

Operation Panel Display Modification Example 1

The printer driver, in response to a request from the MFP to acquire environmental information, searches for and acquires the desktop theme (including the character size for icons, background color, and text color), the monitor size, and the resolution from within the PC, and transmits the acquired information to the MFP. The MFP, based on the acquired information, changes the character size, background color, and text color in the operation panel in the MFP.

A visually handicapped user, for example, who has set the character size in the PC to the size easy to read for the user can set the character size in the operation panel in the MFP to the size identical to that set in the user's own PC. The user does not have to make any special settings for that purpose.

Further, a user, for example one with an impaired color vision, who has set the colors in the PC to the colors easy to recognize for the user can reflect the user's color settings to those in the operation panel in the MFP. The user does not have to make any special settings for that purpose.

Figure 8:
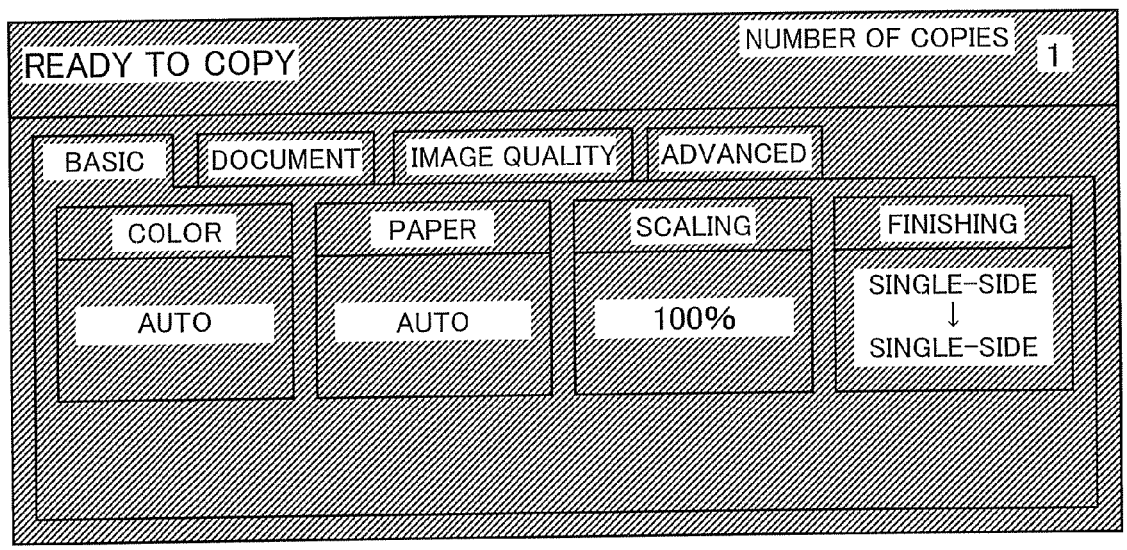
FIGS. 8 to 11 show modification examples of the operation panel display.

FIG. 8 shows a modification example of the operation panel display.

In the display in FIG. 8, the character size has been increased and the display color has been changed from those in the display in FIG. 7 in conformity with the settings in the private PC. For example, in the operation panel with default settings, the characters are displayed in black on the background of white color. In the case where it has been set in the screen in the private PC to display the characters in white on the background of black color, the characters are displayed in white on the black background in the screen in the MFP as well, as shown in FIG. 8.

Operation Panel Display Modification Example 2

The printer driver, in response to a request from the MFP to acquire the environmental information, searches for and acquires, as the settings for a device driver, the settings for a pointing device (whether the functions for the right and left buttons of the mouse are switched therebetween) from within the PC, and transmits the acquired information to the MFP. The MFP, based on the acquired information, changes an arrangement on the operation panel in the MFP.

More specifically, in the case where it is set to switch the functions for the right and left buttons of the mouse in the private PC, the components on the operation panel are displayed by switching the positions between right and left.

The user who has set to switch the functions for the right and left buttons of the mouse is left-handed. The operation panel has the components arranged for right-handed users with default settings (see FIG. 7). Switching the right and left positions for the components on the operation panel improves the usability for the left-handed user.

Figure 9:
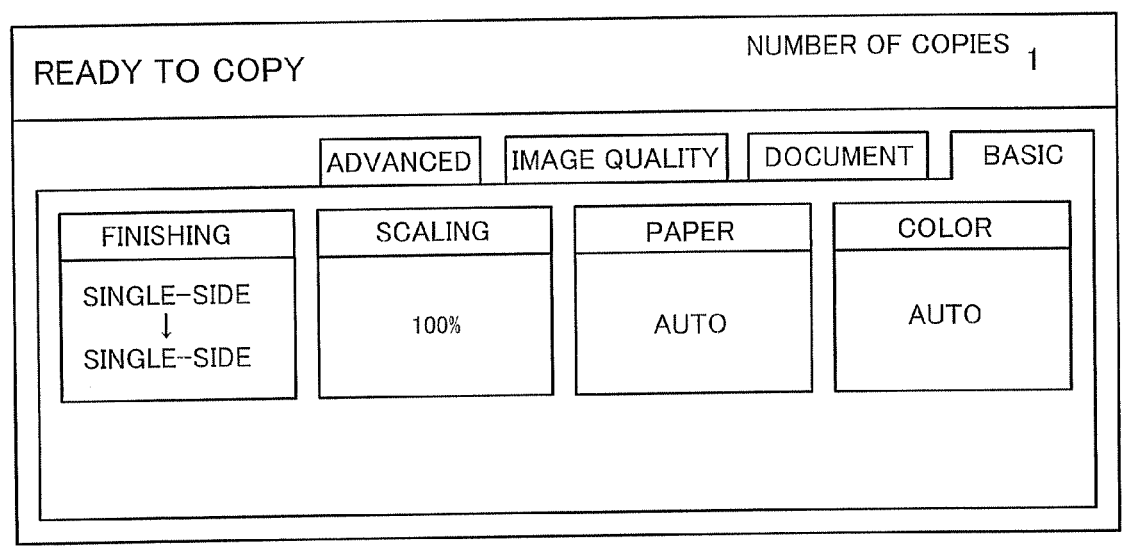

FIG. 9 shows a modification example of the operation panel display.

In FIG. 9, the arrangement of the components on the operation panel has been switched between right and left from the arrangement in the display example shown in FIG. 7, in conformity with the settings in the private PC.

Environmental Settings Modification Example 1

The printer driver, in response to a request from the MFP to acquire the environmental information, searches for and acquires, as the setting information for an application in the PC, the installation condition of speech recognition software from within the PC, and transmits the acquired information to the MFP. In the case where the MFP has a speech recognition function, it sets a speech recognition mode as default (or turns it on), based on the acquired information.

Accordingly, a user who operates the user's own PC via a speech using the speech recognition software can operate the MFP via a speech as well, without the need of any special settings for that purpose. The speech recognition and other settings for a physically handicapped user in the PC may be reflected to the settings in the MFP.

Figure 10:
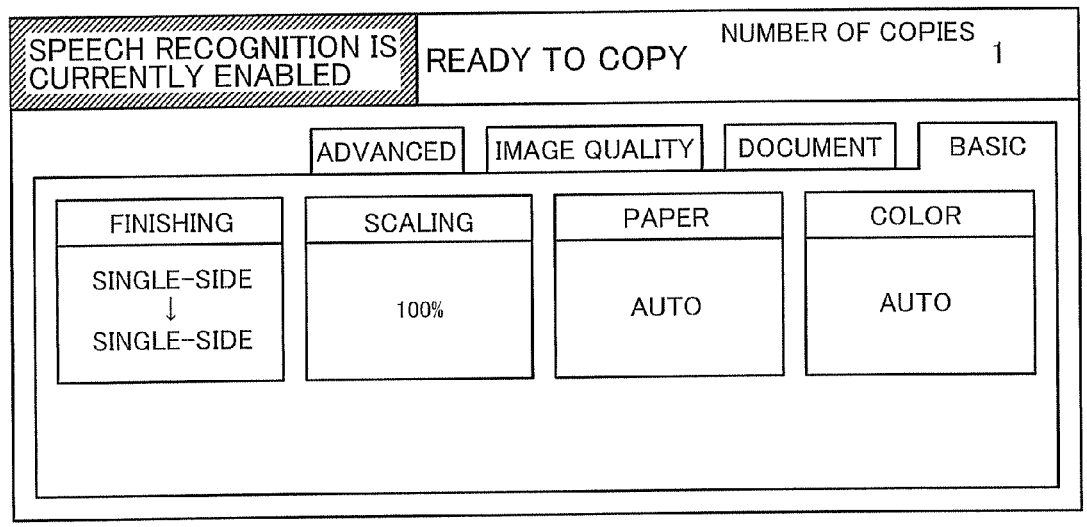

FIG. 10 shows a modification example of the operation panel display.

The display shown in FIG. 10 has been changed from the display shown in FIG. 7 in that the speech recognition function is on as default, in conformity with the settings in the private PC.

Environmental Settings Modification Example 2

The printer driver, in response to a request from the MFP to acquire the environmental information, searches for and acquires the settings for a read-aloud mode for each application from within the PC, and transmits the acquired information to the MFP. In the case where the MFP has a read-aloud function, the MFP sets the read-aloud mode as default (or turns it on), based on the acquired information.

A user who has set the read-aloud mode in the user's own PC, because of visual impairment for example, can use the read-aloud function also in the MFP as default.

Figure 11:
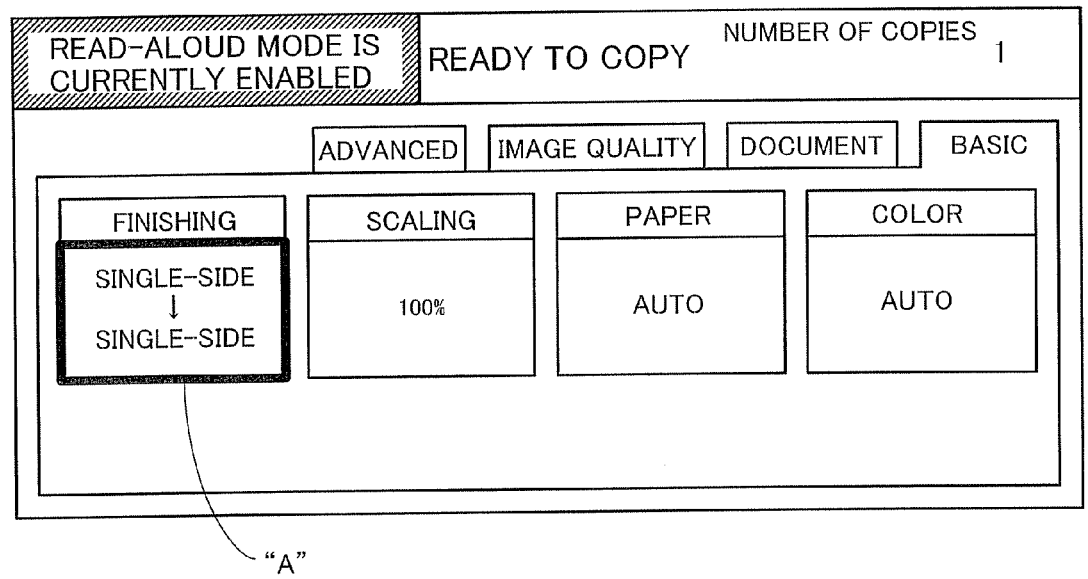

FIG. 11 shows a modification example of the operation panel display.

The display shown in FIG. 11 has been modified from the display in FIG. 7 in that the read-aloud mode is on as default, in conformity with the settings in the private PC. Specifically, the characters in a selected area, delimited by a bold frame "A", are read aloud.

E-Mail Settings Modification Example

The printer driver, in response to a request from the MFP to acquire the environmental information, searches for and acquires the settings for electronic mail software (including a character size, and whether encryption and/or electronic signature is enabled) from within the PC, and transmits the acquired information to the MFP. The MFP sets the character size and enables/disables encryption and/or electronic signature in the e-mail transmitting/receiving function in the MFP, based on the acquired information.

FIG. 12 shows a display example of e-mail text in the MFP with default settings.

In the display in FIG. 12, the character size is standard, and encryption has not been set.

FIG. 13 shows a modification example of the e-mail settings.

The display in FIG. 13 has been modified from the display in FIG. 12 in that the character size has been increased in conformity with the settings in the private PC. Further, encryption and electronic signature are both enabled, as indicated by the messages reading: "This message is being sent encrypted." and "This message is being sent with a digital signature."

In this mainer, it is possible to change the character size for e-mail in the e-mail transmitting/receiving function in the MFP to conform to the character size used in the PC. Further, it is possible to reflect the security settings in the electronic mail software in the PC, including the use of encryption and/or electronic signature, to the settings in the MFP.

Web Browser Settings Modification Example

The printer driver, in response to a request from the MFP to acquire the environmental information, searches for and acquires the settings for a Web browser (including a character size, and whether Cookies and/or active script is enabled) from within the PC, and transmits the acquired information to the MFP. In the case where the MFP has a Web browsing function, the MFP sets the character size and enables/disables Cookies and/or active script in the Web browser in the MFP, based on the acquired information.

Figure 14:
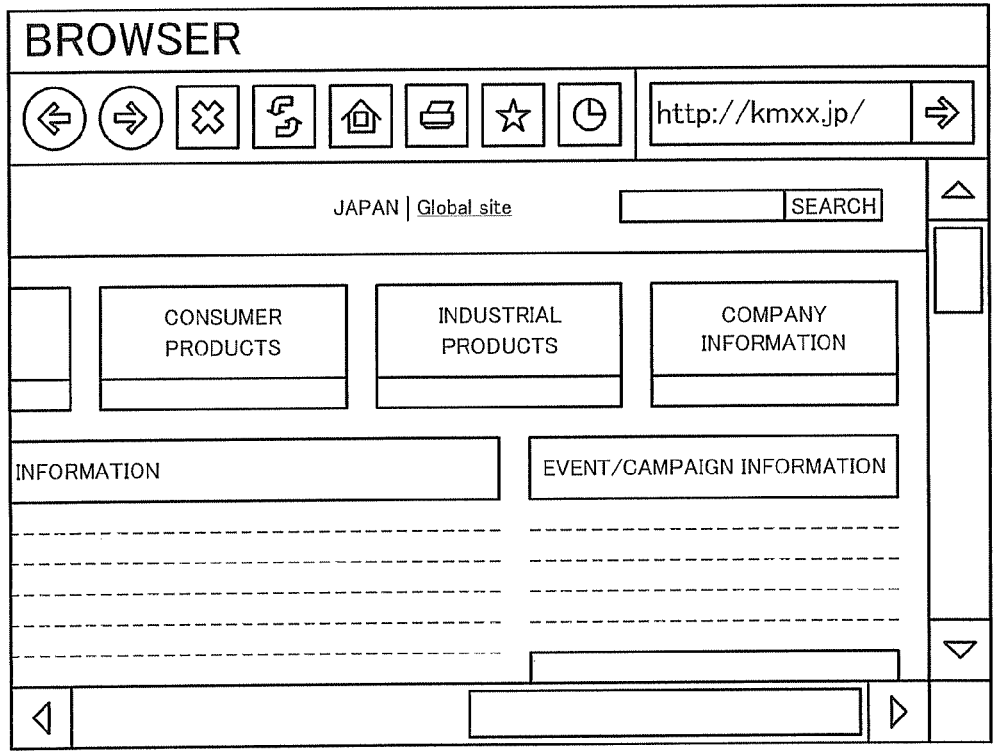
FIG. 14 shows a display example of a Web browser in the MFP with default settings.

FIG. 14 shows a display example of the Web browser in the MFP with default settings.

In FIG. 14, the character size is standard, and Cookies and JavaScript are enabled.

Figure 15:
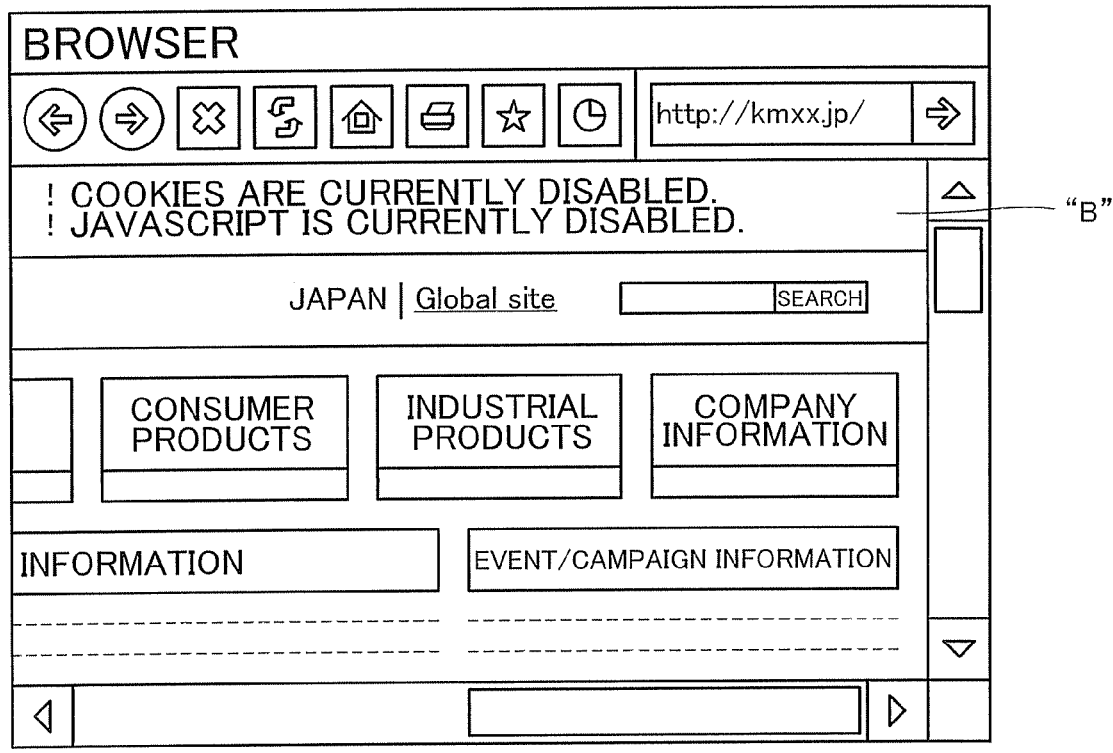
FIG. 15 shows a modification example of the Web browser settings.

FIG. 15 shows a modification example of the Web browser settings.

The display in FIG. 15 has been changed from the display shown in FIG. 14 in that the character size has been increased in conformity with the settings in the private PC. Further, Cookies and active script are disabled, as seen from the messages in the area denoted by "B" in FIG. 15 reading: "! Cookies are currently disabled." and "! JavaScript is currently disabled."

In this manner, it is possible to reflect the character size for the Web browser in the PC to the character size for the Web browser in the MFP. It is also possible to reflect the security settings for the Web browser in the PC, including the permission level of Cookies and execution permission of the active script, to the corresponding security settings in the MFP.

Effects Of The Present Embodiment

The environmental settings for a private PC have usually been completed before the person attempts user registration to the MFP. In the above embodiment, the MFP acquires the environmental settings from the PC, which saves the troubles of setting the operation panel and the like in the MFP.

The display panel on the MFP is often smaller in size than the monitor on the PC (and it is often the case that the image processing device like the MFP does not have a keyboard). Thus, it takes time to perform setting via the display panel of the MFP. According to the present embodiment, the settings in the PC are reflected to the settings in the MFP as they are, thereby solving the above-described problem.

Further, privacy issues can be prevented, because it is unnecessary to register personal information in the MFP.

Furthermore, the security level for the MFP can be set in conformity with the security level for the PC, which prevents vulnerability as the system.

That is, according to the above embodiment, the image processing device which has identified a user of the image processing device establishes communication with an external device which is associated with the identified user, to acquire the information set in the external device. In the image processing device, a setting unit performs setting of the image processing device based on the acquired information. In this manner, the image processing device is set automatically in response to the user identification. Accordingly, it is possible to provide an image processing device, an image processing system, and a control program for the image processing device which facilitate setting of the image processing device.

Others

In the above embodiment, the correspondence between the user ID and the IP address of the private PC are stored in storage unit 119 in MFP 100, as shown in FIG. 2. Alternatively, such correspondence may be stored in an external server, and the MFP may acquire it from the external server.

Further, while the MFP acquires the information from the private PC when the user logs in to the MFP in the above embodiment, the information may be acquired at any time. For example, the MFP may acquire the information in response to an instruction from the user, or the MFP may acquire the information by communicating with the private PCs at regular intervals.

Furthermore, the features described above in the respective examples may be implemented in combination. For example, an image processing device may be configured to perform all the modifications to the settings as illustrated in FIGS. 8 to 15, or perform at least one of such modifications.

The present invention is applicable to a facsimile machine, a copier, a scanner, a printer, and other image processing devices.

Further, the processing in the above embodiment may be performed using software or using hardware circuitry.

It is also possible to provide a program for performing the processing described in the above embodiment. The program may be recorded on a recording medium such as a CD-ROM, flexible disk, hard disk, ROM, RAM, memory card and the like, which may be provided to a user. The processing illustrated in the flowcharts and described above is executed by the CPU according to the program. Alternatively, the program may be downloaded to the device via a communication line such as the Internet.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

What is claimed is:

1. An image processing device comprising:
   a communication unit that communicates with a plurality of external devices registered in association with a plurality of users of said image processing device;
   an identifying unit to identify one of the plurality of users of said image processing device;
   a storage unit that stores a plurality of pieces of address information, each piece of the address information being linked to a respective one of the users and indicating an address of one of the external devices registered in association with the respective one of the users;
   an address obtaining unit which obtains address information of one of the plurality of external devices from the storage unit, wherein the one external device is registered in association with the user identified by said identifying unit; and
   a setting unit;
   wherein the communication unit acquires information which is set in the one external device associated with the user identified by said identifying unit using the address information obtained by the address obtaining unit; and
   wherein the setting unit performs setting of said image processing device based on said acquired information.

2. The image processing device according to claim 1, wherein said communication unit acquires at least one of information regarding environmental settings in said one external device, information regarding settings for a device driver installed in said one external device, and information regarding settings for an application installed in said one external device.

3. The image processing device according to claim 1, wherein
   said communication unit, upon login of a user to said image processing device or in accordance with an instruction from a user, requests a control program included in an external device associated with the user to acquire the information set in the one external device, and
   said setting unit, based on said acquired information, performs at least one of setting of an operation screen included in said image processing device and setting of an application included in said image processing device.

4. The image processing device according to claim 1, wherein
   said communication unit acquires at least one of a character size for an icon, a monitor size, and a monitor resolution, and
   said setting unit, based on said acquired information, sets a character size for an operation screen included in said image processing device.

5. The image processing device according to claim 1, wherein
   said communication unit acquires at least one of a background color and a text color for a desktop, and
   said setting unit, based on said acquired information, sets at least one of a background color and a text color for an operation screen included in said image processing device.

6. The image processing device according to claim 1, wherein said communication unit acquires setting information for a left-handed user as information regarding settings for a device driver installed in said one external device.

7. The image processing device according to claim 1, wherein said communication unit acquires at least one of information regarding installation of speech recognition software and information as to whether a read-aloud function is enabled in said one external device.

8. The image processing device according to claim 1, wherein
   said communication unit acquires at least one of a character size for electronic mail software and security settings for the electronic mail software in said one external device, and
   said setting unit, based on said acquired information, performs setting of a mail transmitting/receiving function in said image processing device.

9. The image processing device according to claim 1, wherein
   said communication unit acquires at least one of a character size for a Web browser and security settings for the Web browser in said one external device, and
   said setting unit, based on said acquired information, performs setting of a Web browser in said image processing device.

10. An image processing system comprising an image processing device and a plurality of external devices connected via a network,
    said image processing device comprising:
    a communication unit that communicates with a plurality of external devices registered in association with a plurality of users of said image processing device;
    an identifying unit to identify one of the plurality of users of said image processing device;

a storage unit that stores a plurality of pieces of the address information, each piece of the address information being linked to a respective one of the users and indicating an address of one of the external devices registered in association with the respective one of the users;

an address obtaining unit which obtains address information of one of the plurality of external devices from the storage unit, wherein the one external device is registered in association with the user identified by said identifying unit; and a setting unit;

wherein the communication unit acquires information which is set in the one external device associated with the user identified by said identifying unit using the address information obtained by the address obtaining unit; and wherein the setting unit performs setting of said image processing device based on said acquired information;

each of said external devices comprising:

a collecting unit to collect at least one of information regarding environmental settings in said external device, information regarding settings for a device driver installed in said external device, and information regarding settings for an application installed in said external device; and a transmitting unit to transmit said collected information to said image processing device;

wherein said communication unit in said image processing device acquires the information transmitted from said transmitting unit in said external device.

11. A non-transitory computer readable medium storing a control program for an image processing device to cause a computer to execute processing comprising the steps of:

identifying one user from a plurality of users of said image processing device;

storing a plurality of pieces of the address information in a storage of the image processing device, each piece of the address information being linked to a respective one of the plurality of users and indicating an address of one of the external devices registered in association with the respective one of the users;

obtaining address information from the storage of one of a plurality of external devices connected to the image processing device, wherein the one external device is registered in association with the user identified in said identifying step;

acquiring information which is set in the one external device associated with the user identified in said identifying step using the obtained address information;

performing setting of said image processing device based on said acquired information.

12. An image processing device comprising:

an identifying unit to identify one user from a plurality of users of said image processing device;

a storage unit that stores a plurality of pieces of address information, each piece of the address information being linked to a respective one of the plurality of users and indicating an address of an external device registered in association with the respective one of the users;

a communication unit to communicate with an external device which is in association with the user identified by said identifying unit by using the stored address information;

an acquiring unit to acquire, as setting information, an installation condition of software having a predetermined function which is installed in said external device by, upon login of the user to said image processing device or in accordance with an instruction from the user, requesting setting information from a control program included in said external device through said communication unit; and a reflecting unit to reflect information about said predetermined function on a display of an operation screen included in said image processing device.

13. A non-transitory computer readable medium storing a control program for an image processing device to cause a computer to execute processing comprising the steps of:

identifying one user from a plurality of users of said image processing device;

storing a plurality of pieces of the address information in a storage of the image processing device, each piece of the address information being linked to a respective one of the users and indicating an address of one of the external devices registered in association with the respective one of the users;

communicating with an external device which is in association with the user identified by said identifying step;

acquiring, as setting information, an installation condition of software having a predetermined function which is installed in said external device by, upon login of the user to said image processing device or in accordance with an instructions from the user, requesting setting information from a control program included in said external device in said communicating step; and reflecting information about said predetermined function on a display of an operation screen included in said image processing device.

\* \* \* \* \*